Jan. 28, 1964 J. KIRSCH ETAL 3,119,357
SHOCK-ABSORBING MOTION-RETARDING PALLET
Filed Jan. 30, 1962 2 Sheets-Sheet 1
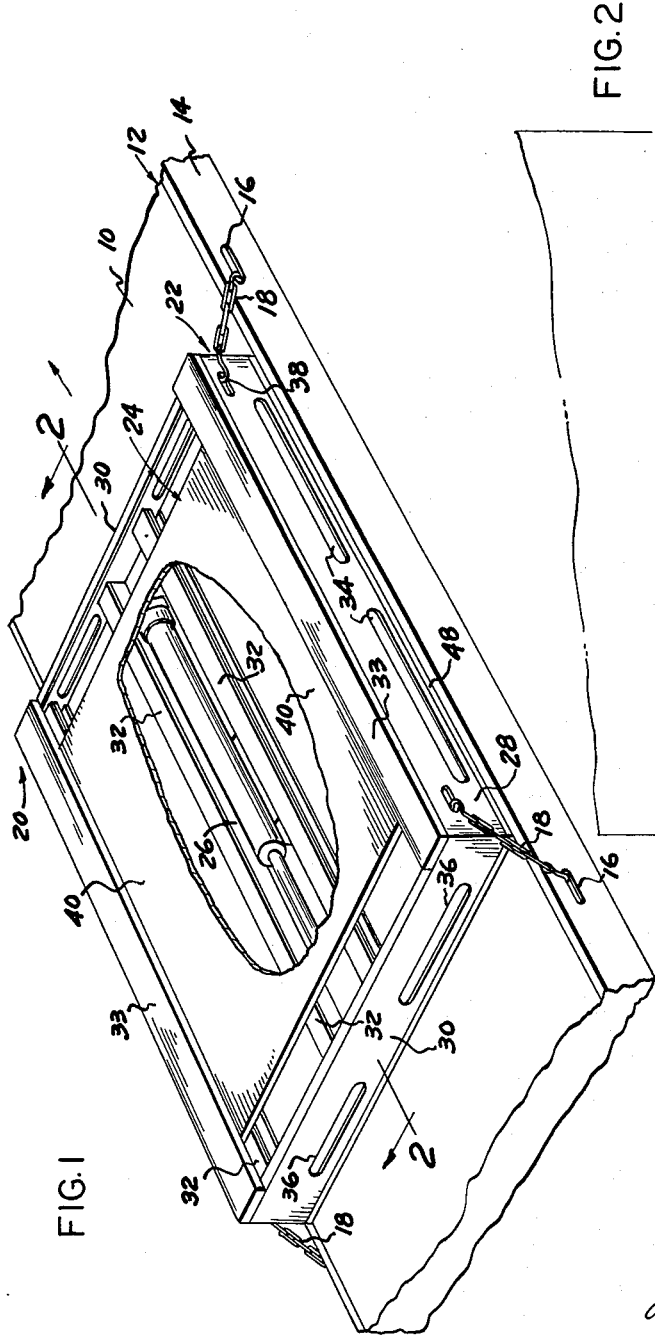
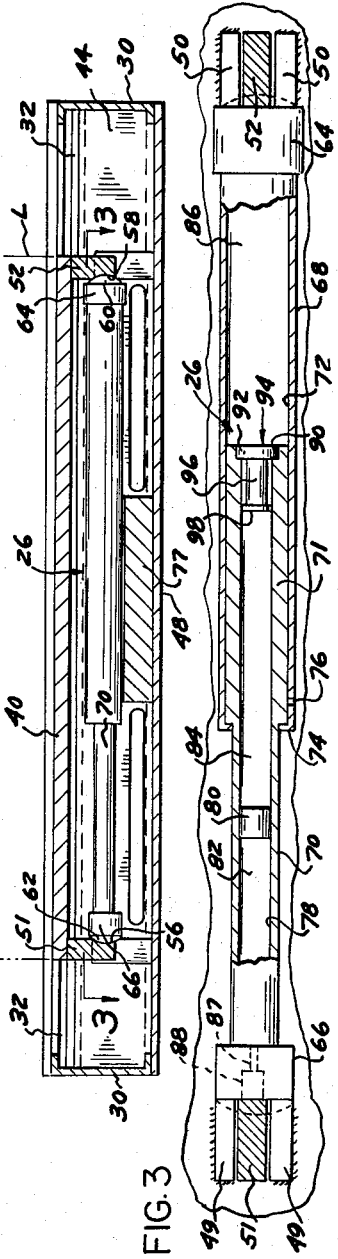
INVENTORS.
JERRY KIRSCH
BY EMIL J. TITO
Barthel & Bugbee
ATTORNEYS.

Jan. 28, 1964   J. KIRSCH ETAL   3,119,357
SHOCK-ABSORBING MOTION-RETARDING PALLET
Filed Jan. 30, 1962   2 Sheets-Sheet 2
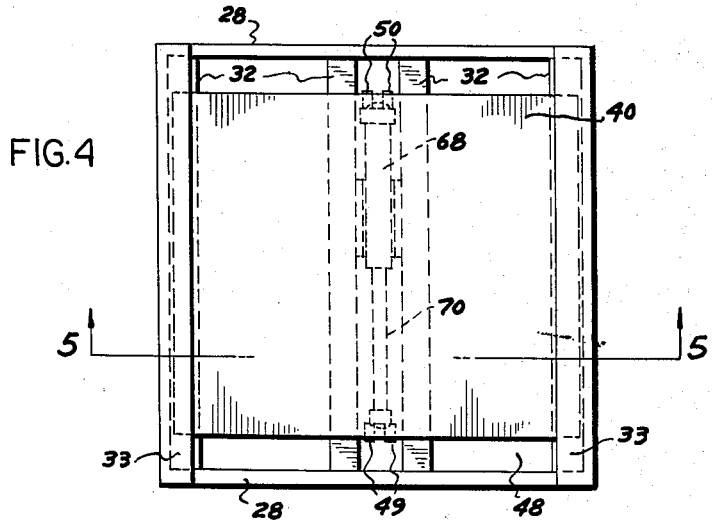
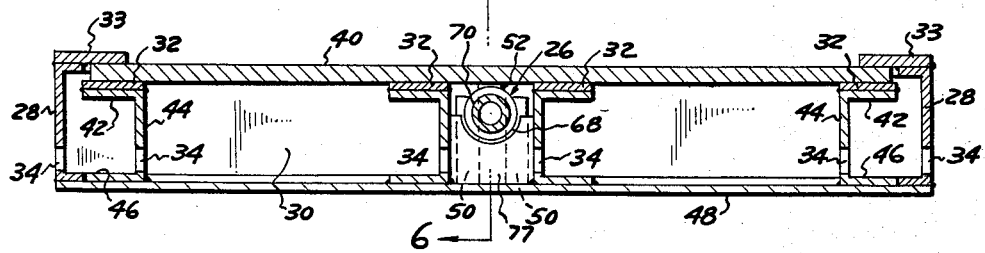
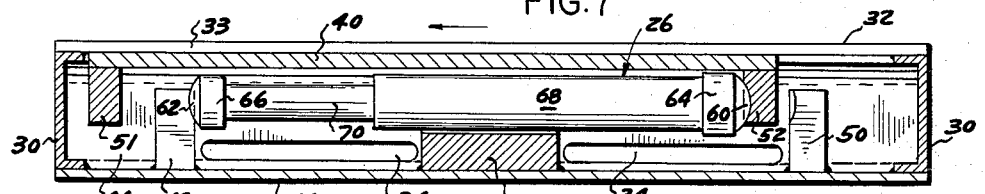
INVENTORS.
JERRY KIRSCH
BY EMIL J. TITO
ATTORNEYS / 3,119,357
SHOCK-ABSORBING MOTION-RETARDING PALLET
Jerry Kirsch, 3946 Bishop Road, and Emil J. Tito, 3915 Bishop Road, both of Detroit 24, Mich.
Filed Jan. 30, 1962, Ser. No. 169,714
6 Claims. (Cl. 108—51)

This invention relates to pallets, such as are used to support boxes, bins or other loads while being transported and in particular, to pallets suitable for vehicle mounting and transportation.

One object of this invention is to provide a shock-absorbing motion-retarding pallet which may be mounted upon or in a cargo vehicle, such as a railway flat car, freight car or baggage car, highway truck, trailer, semi-trailer, cargo aircraft or ship, and which permits the speed of the load carried thereby to be subjected to a controlled retarded rate of deceleration or acceleration upon the occurrence of a more rapid deceleration or acceleration of the vehicle which might otherwise cause damage to the cargo by a rapid deceleration or acceleration of the vehicle itself.

Another object is to provide a shock-absorbing motion-retarding pallet of the foregoing character which is adapted to be conveyed from place by a conventional fork-lift truck, the forks of which are inserted through slots in the side walls of the stationary portion of the pallet.

Another object is to provide a shock-absorbing motion-retarding pallet of the foregoing character wherein the rate of deceleration or acceleration of the movable load-supporting part of the pallet by the action of a hydro-pneumatic retarding device is caused to be reduced to a controlled rate well below the rate of deceleration or acceleration of the relatively stationary portion of the pallet mounted on the vehicle.

Another object is to provide a shock-absorbing motion-regarding pallet of the foregoing character wherein the deceleration and acceleration of the load may be maintained below a predetermined rate considered to be damaging to the particular cargo or other load, the controlled deceleration or acceleration being effected by means of a load-supporting slide coupled to a relatively stationary support through a hydro-pneumatic reciprocatory motor and operative in either of the opposite directions of travel of the vehicle.

Other objects and advantages of the invention will become apparent during the course of the following description of the accompanying drawings, wherein:

FIGURE 1 is a perspective view of a shock-absorbing motion-retarding pallet according to one form of the invention, as mounted upon the bed or chassis of a vehicle shown in fragmentary form;

FIGURE 2 is a central vertical section through the pallet shown in FIGURE 1, taken along the line 2—2 therein, with the hydro-pneumatic shock-absorbing cushioning cylinder shown in side elevation;

FIGURE 3 is an enlarged top plan view, mainly in central horizontal section, of the shock-absorbing hydro-pneumatic motor or cylinder shown in FIGURES 1 and 2, taken along the line 3—3 in FIGURE 2 with the parts in their fully-extended positions;

FIGURE 4 is a reduced-size top plan view of the shock-absorbing pallet shown in FIGURE 1;

FIGURE 5 is a cross-section taken along the line 5—5 in FIGURE 4;

FIGURE 6 is a central vertical longitudinal section similar to FIGURE 2, but showing the relative positions of the moving parts during controlled retarded deceleration of the pallet slide in the course of forward travel deceleration of the vehicle; and FIGURE 7 is a view similar to FIGURE 6 but showing the relative positions of the moving parts during controlled retarded deceleration of the vehicle in the course of rearward travel thereof.

Referring to the drawing in detail, FIGURE 1 shows diagrammatically the floor 10 of a vehicle, generally designated 12, having side members 14 provided with conventional connections 16 for so-called chain binders 18 by which is anchored a shock-absorbing motion-retarding pallet, generally designated 20, according to one form of the present invention. The vehicle 12 may consist of a railroad flat car, freight car, baggage car or the like, or it may be a truck, semi-trailer, cargo aircraft or ship's deck, as the case may be.

The pallet 20 consists generally of a relatively stationary frame structure or base structure 22 supporting a relatively-slidable load-carrying structure, generally designated 24, connected thereto through a hydro-pneumatic shock-absorbing controlled motion-retarding reciprocatory motor, generally designated 26, described more fully below. The "relatively stationary" structure 22 is so called because it does not move relatively to the floor or bed 10 during operation, even though the vehicle having the floor or bed 10 does move relatively to the road, road bed, ground or surface of the sea, as the case may be, whereas the slidable load-carrying structure 24 does so move relatively to the vehicle floor 10.

The stationary frame structure or base structure 22 is of approximately rectangular shape and is composed of channel side members 28 interconnected by channel cross members or end members 30. Extending between the end members 30 are guideways or guide bars 32 serving to slidably support the movable load-carrying structure 24. For simplicity and clarity of disclosure, the load-carrying structure 24 has been shown as supported upon the guideways 32 by plain bearings. It will be understood, however, that the structure 24 is equally well adapted to be supported on anti-friction rollers in order to further reduce the friction and to substantially eliminate jolts incidental to the retarding action of such friction. The relatively-slidable load-carrying structure 24 is retained in position by retaining bars or gibs 33 located near the stationary frame side members 28 and extending between the opposite end members 30.

One of the side members 28 and one of the end members 30 is provided with a pair of slots 34 or 36 respectively for the insertion of the parallel horizontal forks of a conventional fork-lift truck (not shown). By this means, the shock-absorbing motion-retarding pallet 20 with its load L may be hauled from place to place and deposited on the floor 10 of the vehicle 12 and anchored in position by the chain 18 attached to the connection 16 on the side member 14 of the floor or bed 10 of the vehicle 12. The opposite end of the chain 18 is connected as at 38 (FIGURE 1) to the relatively stationary frame structure 22.

The relatively-movable load-carrying structure 24 rests upon and slidably engages the guides members or guideway 32 and consists of a rectangular plate 40 off steel or other suitable material. The box or other cargo load L rests upon the slide plate 40 and is secured thereto. It will also be understood that the plate 40 may constitute the bottom of a box-shaped container in which parcels or other articles may be placed in order to protect them from the weather during transit. The guide bars 32 are secured to and rest upon the upper flanges 42 (FIGURE 5) of vertical channel members 44, the lower flanges 46 of which rest upon and are secured to a bottom plate 48 welded or otherwise secured to the longitudinal members 28 and cross members 30 of the stationary frame structure 22.

Welded or otherwise secured to the bottom plate 48 of the relatively stationary frame structure 22 are longitudinally-spaced pairs of upstanding abutment members 49 and 50 (FIGURES 3, 5, 6 and 7), the individual abutment members 49 or 50 of which are spaced laterally apart from one another (FIGURE 3). Welded or otherwise secured to the top plate 40 of the relatively movable cargo-carrying structure 24 are two longitudinally-spaced depending or downwardly-extending thrust plates 51 and 52 extending into the spaces between the upstanding stationary abutment members 49 and 50 so as to slide freely between them. The upstanding stationary abutment members 49 and 50 and the thrust plates 51 and 52 have spherical concave recesses or seats 56 and 58 respectively for receiving the correspondingly-curved spherical convex end surfaces 60 and 62 of the cylinder head 64 and piston rod end 66 of the hydro-pneumatic reciprocatory motor 26 (FIGURES 2, 6 and 7) so as to minimize any adverse effects of misalignment arising either during assembly or operation by providing a relatively sliding self-aligning or pivoting connection therebetween.

The cylinder head 64 is connected to and closes one end of a cylinder 68 (FIGURE 3), whereas the piston rod end 66 forms the forward end of a hollow piston rod 70 connected to a hollow piston head 71 reciprocably mounted within the cylinder bore 72 of the cylinder 68. The cylinder 68 near its open end 74 through which the hollow piston rod 70 passes is provided with a vent port 76, and slidably engages a guide block 77 on the bottom plate 48.

The hollow piston rod 77 is provided with a longitudinal bore 78 in which is reciprocably mounted a free or floating piston 80 dividing the piston rod bore 78 into a pneumatic chamber 82 filled with a suitable compressed gas, such as compressed nitrogen, and an intermediate or middle hydraulic chamber 84 adapted to be filled with and temporarily at least partially emptied, during operation, of a suitable hydraulic working fluid, such as oil. The end of the cylinder bore 72 contains a main hydraulic chamber 86, also adapted to contain the same hydraulic working fluid, such as oil. The piston rod end 66 is provided with a passageway 87 closed by a pneumatic charging fitting 88 containing a valve (not shown) similar to that of a pneumatic tire-filling valve and provided for the purpose of charging the pneumatic chamber with the compressed gas just mentioned.

The hollow piston rod bore 78 at the end opposite the piston rod end 66 is provided with a counterbore 90 into which is threaded or otherwise secured the correspondingly threaded flange 92 of a flow control valve, generally designated 94. The flow control valve 94 contains a spring-pressed tubular reciprocatory valve member (not shown) which opens and closes wall ports in the valve casing 96 between the flanges 92 and 98 thereof. The flange 92 has longitudinal ports (not shown) connecting the space between the flanges 92 and 98 through the main hydraulic chamber 86.

The flow control valve 94 is of any suitable type responsive to the attainment of a predetermined pressure in the intermediate hydraulic chamber 84 to open and discharge hydraulic fluid therefrom into the main hydraulic chamber 86. The flow control valve 94 contains a small "through" passageway (not shown) permitting small quantities of hydraulic fluid to flow in opposite directions between the chambers 84 and 86. Such a suitable flow control valve 94 is disclosed and claimed in combination with the hydro-pneumatic cushioning or impact shock absorbing cylinder or motor 26 in the co-pending Kirsch application, Serial No. 72,476 filed November 29, 1960, for Constant Speed Reciprocable Hydro-Pneumatic Motor, now U.S. Patent 3,079,897 of March 6, 1963, and is shown particularly in FIGURE 3 thereof.

In the operation of the shock-absorbing motion-retarding pallet 20 of the present invention, let it be assumed that a load L, such as a box, has been mounted on and secured to the slide plate 40 (FIGURE 2) of the pallet 20 while the relatively stationary frame 22 thereof is resting upon the floor of a warehouse or other approximately horizontal surface from which is it intended to be moved to the cargo-carrying vehicle 12. Let it also be assumed that the hydro-pneumatic reciprocatory cushioning motor 26 has been charged with hydraulic and pneumatic fluid of the type described above, with the hydraulic fluid occupying the chambers 84 and 86 and the pneumatic fluid in the chamber 82 (FIGURE 3).

The fork lift truck operator then moves his truck up to the pallet 20 and inserts the fork thereof either through the side slot 34 or end slots 36 thereof, which is more convient, operates the lifting mechanism to cause the fork to move upward and carry with it the pallet 20 and its cargo load L and then operates the fork lift truck to carry this burden up to and upon the floor or bed 10 of the vehicle 12, depositing it in the desired location. The operator then anchors the pallet 20, with its cargo load L, to the vehicle floor or bed 10 by means of the chains 18 between the connections 38 and 15. The vehicle 12 is then ready for travel, which for the purpose of the present example will be assumed to be from left to right in the direction of travel indicated by the arrow at the upper right-hand side of FIGURE 1.

Let it be assumed that during the travel of the vehicle 12, the operator of the vehicle 12 has been forced to apply the brakes thereof suddenly, causing rapid deceleration of the vehicle 12. The cargo load L on each pallet 20, of which there may be many secured to the vehicle floor or bed 10, by reason of its acquired momentum, continues to travel in a forward direction from left to right, moving the movable cargo-carrying structure 24 from left to right in FIGURE 1. As this occurs, the hollow piston rod 70 connected to the top plate 40 of the relatively movable cargo-carrying structure 24 by the piston rod end 66 and thrust plate 51 is forced toward the forward end of the bed or floor 10 of the vehicle 12 as the thrust plate 51 moves outward to the right from between the stationary abutments 49. This action forces the flow control valve 94 of the cushioning reciprocatory motor 26 to open and thereby to permit hydraulic fluid to flow at a controlled rate and constant speed from the main hydraulic chamber 86 into the intermediate hydraulic chamber 84 where it in turn forces the free piston 80 to move toward the piston rod end 66, further compressing the gas in the pneumatic chamber 82.

This action produces a controlled retarded deceleration of the movable pallet cargo-carrying structure 24 relatively to the more rapidly decelerating relatively stationary frame structure 22 which is anchored to the vehicle floor or bed 10. In consequence, the reduced deceleration thereby produced prevents damage which might otherwise occur to the cargo or load L if the latter were fixedly secured to the vehicle bed or floor 10. Meanwhile, if any weaving or misalignment of the components of the cushioning reciprocatory motor 26 occur, the rounded ends 60 and 62 of the cylinder head 64 and piston rod end 66 self-align themselves in their respective spherically-curved concave recesses 56 and 58.

When the deceleration of the cargo vehicle 12 has ceased, the pressure of the pneumatic fluid thereby compressed in the pneumatic chamber 82 of the cushioning cylinder or motor 26 by the movement of the free or floating piston 80 therein causes the hollow piston rod 70 to move away from its respective cylinder 68. This action pushes the movable load-carrying structure 24 of the pallet 20 to the left (FIGURE 1) toward its original position relatively to the relatively stationary frame structure 22 of the pallet 20, thus returning the load L to its original position without damage.

The shock-absorbing pallet 20 also serves to protect the load or cargo L against damage due to rapid acceleration or deceleration during backing as well as during forward travel. The cushioning cylinder or motor 26 under these circumstances provides a controlled deceleration for the cargo load L when the latter and its supporting frame 24 move rearwardly in response to the rapid deceleration or halting of the vehicle 12 in a rearward direction, in a manner similar to that described above for the forward deceleration, except that the thrust plate 52 now moves outward to the left from between its abutments 50, pushing the cylinder 68 toward the piston head 71 as the piston rod end 66 is held stationary against the abutments 49.

What we claim is:

1. A shock-absorbing motion-retarding pallet for use on a vehicle, comprising
   a generally horizontal base structure adapted to be secured to the vehicle and having longitudinally-disposed guide means thereon,
   a generally horizontal load-carrying structure slidably mounted on said guide means for sliding motion longitudinally of said base structure in the direction of travel of the vehicle,
   and a fluid pressure motion-retarding reciprocatory motor disposed between said structures and having a cylinder element engaging one of said structures and a piston element reciprocably mounted in said cylinder element engaging the other of said structures,
      said motor including means responsive to the attainment of a predetermined pressure within said motor for controlledly releasing pressure fluid from one of said elements into the other element in consequence of relative motion between said elements.

2. A shock-absorbing motion-retarding pallet, according to claim 1,
   wherein said motor piston has a hollow piston rod,
   wherein an auxiliary piston head is mounted for reciprocation within said piston rod, and
   wherein pneumatic fluid is disposed on one side of said auxiliary piston head and hydraulic fluid on the other side thereof.

3. A shock-absorbing motion-retarding pallet, according to claim 1,
   wherein said base structure has an abutment thereon engaging one of said elements,
   wherein said load-carrying structure has a thrust member projecting therefrom into engagement with the other element wherein said load-carrying structure includes a load-carrying plate, and wherein said thrust member is secured to and depend from said plate.

4. A shock-absorbing motion-retarding pallet, according to claim 1,
   wherein said base structure has a pair of longitudinally-spaced abutments thereon,
   wherein said motor is disposed between said abutments with its elements contactingly engaging said elements,
   wherein said load-carrying structure has a pair of longitudinally-spaced thrust members projecting therefrom into adjacency to said abutments and into contacting engagement with said elements, wherein said load-carrying structure includes a load-carrying plate, and wherein said thrust members are secured in longitudinally-spaced relationship to said plate and depend therefrom into adjacency to their respective abutments.

5. A shock-absorbing motion-retarding pallet, according to claim 1, wherein said pressure-fluid releasing means releases pressure fluid at an approximately constant rate of fluid flow.

6. A shock-absorbing motion-retarding pallet, according to claim 1, wherein said pressure-fluid releasing means includes a hollow valve casing having wall ports therein and a spring-pressed reciprocatory valve member reciprocably mounted in said valve casing in opening and closing relationship with said wall ports.

References Cited in the file of this patent

UNITED STATES PATENTS

| | | |
|---|---|---|
| 2,695,764 | Grebe | Nov. 30, 1954 |
| 2,933,339 | Alvden | Apr. 19, 1960 |
| 2,973,174 | Stanwick et al. | Feb. 28, 1961 |
| 2,994,301 | Kirsch | Aug. 1, 1961 |